United States Patent [19]

Lex et al.

[11] Patent Number: 4,971,855
[45] Date of Patent: Nov. 20, 1990

[54] WEAR-RESISTANT GLOSSY LAMINATES

[75] Inventors: Joseph Lex; Robin D. O'Dell, both of Pasadena; Herbert I. Scher; Israel S. Ungar, both of Randallstown, all of Md.

[73] Assignee: Nevamar Corporation, Odenton, Md.

[21] Appl. No.: 188,879

[22] Filed: May 2, 1988

[51] Int. Cl.$^5$ .......................... B32B 5/16; B32B 7/00
[52] U.S. Cl. .................................. 428/206; 428/211; 428/219; 428/329; 428/447; 428/486; 428/908.8
[58] Field of Search ............... 428/908.8, 329, 331, 428/206

[56] References Cited

U.S. PATENT DOCUMENTS

| | | |
|---|---|---|
| Re. 30,233 | 3/1980 | Lane et al. . |
| Re. 32,152 | 5/1986 | Scher .................................. 428/329 |
| 3,373,070 | 3/1968 | Fuerst . |
| 3,373,071 | 3/1968 | Fuerst . |
| 3,525,664 | 8/1970 | Hale et al. ........................... 428/331 |
| 3,928,706 | 12/1975 | Gibbons . |
| 3,968,291 | 7/1976 | Chevallier . |
| 3,975,572 | 8/1976 | Power . |
| 4,305,987 | 12/1981 | Scher .................................. 428/329 |
| 4,322,468 | 3/1982 | Raghava . |
| 4,395,452 | 7/1983 | Scher .................................. 428/329 |
| 4,473,613 | 9/1984 | Jaisle et al. . |

FOREIGN PATENT DOCUMENTS

| | | |
|---|---|---|
| 600787 | 6/1960 | Canada . |
| 652489 | 11/1962 | Canada ............................... 428/331 |
| 49-96089 | 9/1974 | Japan . |
| 7867075 | 6/1975 | Japan . |

Primary Examiner—George F. Lesmes
Assistant Examiner—J. M. Gray
Attorney, Agent, or Firm—Browdy and Neimark

[57] ABSTRACT

A glossy laminate is made using highly polished caul plates, the laminate having superior sliding can wear resistance, and without damaging the plates. This result is effected by use of the technology of Scher et al. U.S. Pat. No. 4,255,480; O'Dell et al. U.S. Pat. No. 4,491,137 and 4,567,087; and/or Ungar et al. U.S. Pat. No. 4,713,138, except that the particles size of the grit is maintained at less than 9 micrometers. In this way a glossy laminate is obtained which retains its glossy appearance under normal wear conditions, and without rapid destruction of the expensive polished caul plates.

17 Claims, 1 Drawing Sheet

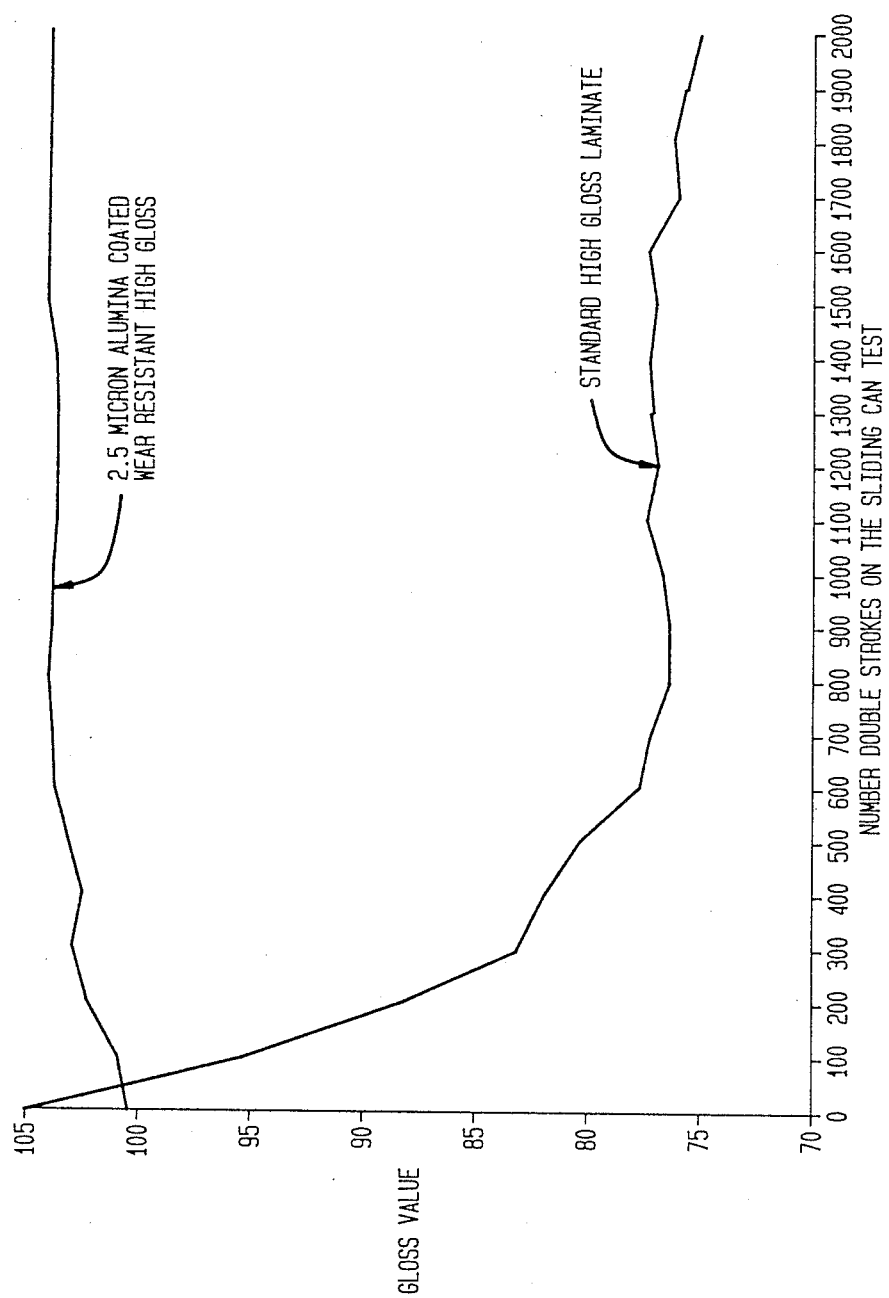

WEAR-RESISTANT GLOSSY LAMINATES

Field of Invention

The present invention relates to laminates and, more particularly, to glossy decorative laminates having good scuff and surface wear resistance.

Background of the Invention

High pressure decorative laminates are conventionally produced by stacking and curing under heat and pressure a plurality of layers of paper impregnated with various synthetic thermosetting resins. In normal practice the assembly comprises a plurality of core sheets made from phenolic resin impregnated kraft paper, above which lies a decor sheet impregnated with melamine resin; on top of the decor sheet there has been commonly provided an-overlay sheet which, in the laminate, is almost transparent and provides protection for the decor sheet.

The core sheets are conventionally made from kraft paper of about 90-155 pound ream weight. Prior to stacking, the kraft paper is impregnated with a water-alcohol solution of phenolformaldehyde resole, dried and partially cured in a hot air oven, and finally cut into sheets.

The decor sheet is a high quality, 50-125 ream weight, pigment filled, alpha cellulose paper that has been impregnated with water-alcohol solution of melamine-formaldehyde resin, dried and partially cured, and finally cut into sheets. The decor sheet, prior to impregnation with the resin, is sometimes printed with a decorative design, or with a photo-gravure reproduction of natural materials, such as wood, marble, leather, etc., but it may also be solid colored.

The overlay sheet, often omitted for solid color laminate, has been almost invariably used when the decor sheet has a surface printing in order to protect the printing from abrasive wear. The overlay sheet is a high quality alpha cellulose paper of about 15-35 pounds ream weight which is also impregnated with melanine-formaldehyde resin in a manner similar to that used for the decor sheet, except that a greater amount of resin per unit weight of paper is used. The individual sheets are stacked in the manner indicated above and, if six sheets of impregnated core paper are used, there results a finished laminate having a thickness of about 50 mils, it being understood that a different number of sheets can be used to provide thicker or thinner laminates.

The stack of sheets as described above is placed between polished steel plates and subjected to about 110-170° C. (e.g. 150° C.) at 800114 1600 p.s.i. (e.g. 1000 p.s.i) for a time sufficient to consolidate the laminate and cure the resins (e.g. about twenty-five minutes). This causes the resin in the paper sheets to flow, cure and consolidate the sheets into a unitary laminated mass referred to in the art as a decorative high-pressure laminate. In actual practice, two laminated stacks are often pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminating operation, the backs of the laminates are sanded to permit gluing to particle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in more recent years, including low-pressure laminates using either saturated polyester resins or melamineformaldehyde risen. One of the fastest growing materials competing with high-pressure laminates in more recent years is a product referred to as low-pressure melamine board which is normally pressed in a short cycle at 175-225 p.s.i. and 160-175° C. These low-pressure products have the advantage of being normally less expensive, but they cannot be given the title of "high pressure laminates" because such a product must meet a variety of rigid standards promulgated by the National Electric Manufacturers Associates, NEMA LD3-1985, which include standards relating to abrasive wear, stain resistance, heat resistance, impact resistance, dimensional stability, etc. While various other decorative printed surfacing materials, such as some of the low-pressure laminates, have certain of the desirable characteristics, no products other than high-pressure laminates currently available have all of these properties.

One of these properties in particular which is normally important is abrasion resistance. A "high-pressure decorative laminate" must have sufficient abrasion resistance to permit use in high exposure areas such as dinette surface tops, check-out counters, etc. The standard NEMA test for abrasion resistance is NEMA test LD-3.01. In this test, a laminate sample is clamped on a rotating disc, over which ride two weighted rubber wheels, faced with calibrated sandpaper strips. As the laminate surface is rotated under the wheels, the abrasive action of the sandpaper cuts through the surface of the laminate and gradually through the overlay until the printed pattern is exposed and destroyed. The NEMA standard for Class 1 laminate requires that the laminate, after four hundred rotation cycles, have no more than 50% of its pattern destroyed. The 50% end point is estimated by averaging the number of cycles at which the pattern shows initial wear, and the number of cycles at which the pattern is completely destroyed.

If a high-pressure decorative laminate having a printed pattern is prepared in a conventional manner, with a normal 35-40% resin content in the decor sheet, but without an overlay sheet the abrasion resistance will be only about 50-75 cycles. If specially formulated melamine resins are used in the decor sheet with a resin content of 50-55%, abrasion resistance of up to about 150-200 cycles are on occasion obtainable without an overlay sheet, but in this latter case the laminates have a tendency to develop surface craze and, furthermore, they are quite difficult to prepare due to the difficulty of impregnating the decor sheet in a uniform manner; additionally, they do not meet the 400 cycle minimum required by the NEMA standard. Solid color high pressure decorative laminate without overlay can more easily meet the NEMA Abrasion Standard because the pattern is not completely destroyed until the decor sheet has worn through to expose the core.

Very significant improvements to the conventional system described above have been achieved by the system disclosed in Scher et al U.S. Pat. No. 4,255,480 and its progeny including U.S. Pat. No. Reissue 32,152 which disclose the production of highly abrasion resistant laminates without overlay, the decor sheet being coated with an ultra-thin layer of small abrasion-resistant particles, e.g. alumina, immobilized in place on the decor sheet by a suitable binder material, most desirably micro-crystalline cellulose. The elimination of the overlay sheet produces very significant economic advantages. In addition, the resultant laminates have superior abrasion resistance, meeting not only the highest NEMA abrasion resistance standards, but also having both superior "initial wear" resistance and superior wear resistance to rubbing and sliding cans and trays (hereinafter "sliding can wear"). Elimination of the overlay also simplifies manufacture and reduces cost.

In addition to the above, another source of damage to a laminate surface is scuffing. Prior to the actual installation of a laminate surface, the laminate sheet must be handled many times, cut to size, bonded to a substrate, cut to final size, edged, and then finally moved to a final location and installed. During all this handling, the laminate surface can come into sliding contact with surfaces of other sheets, corners of sheets, and corners of edges of other materials. During these various sliding contacts, the laminate surface can gain unsightly scuff marks, which are not distinctly scratches or cuts in the laminate surface.

While the laminates as disclosed in the aforementioned Scher et al U.S. Pat. Nos. 4,255,480 and U.S. Pat. No. Re 32,152 are much improved in abrasion resistance, initial wear resistance and sliding can wear resistance, they are nevertheless subject to scuffing, especially of the "galling" type, and this is so because their surfaces can act, at the microscopic level, like sandpaper, i.e. the hard particles at the surface of the decor sheet can actually protrude above the surface of the finished laminate. This problem is exacerbated when the decor sheet is solid, dark colored. However, the problem of scuff resistance is solved by the incorporation of solid lubricant as disclosed in the O'Dell et al U.S. Pat. Nos. 4,491,137 and 4,567,087.

In the recent Ungar et al U.S. Patent No. 4,713,138, an improved method of producing abrasion-resistant decorative laminate is disclosed in which the abrasive-resistant particles, with or without additional solid lubricant particles, is applied in a single step during impregnation of the decor sheet with resin solution.

In spite of the revolutionary improvements achieved by the technology of the aforementioned Scher et al U.S. Pat. Nos. 4,255,480 and Re 32,152, especially in conjunction with the technology of the aforementioned O'Dell U.S. Pat. No. '137 and '087, a problem has continued to exist in the manufacture of glossy surface laminates. Thus, the ability to provide a glossy surface which is highly abrasion resistant according to said Scher et al, O'Dell et al and Ungar et al patents has been impractical because of the presence in the abrasion resistant surface of the abrasive grit and the effect of such abrasive grit on the glossy caul plates used to make a glossy surfaced laminate. Thus, the expensive glossy caul plates used to make make glossy laminates are highly polished and very easily subjected to scratching. It is economically unfeasible to use these glossy plates in a process in which the plates become easily scratched or dulled.

These plates are so easy to scratch that it is well known that even conventional overlay paper will dull such glossy plates if the overlay paper is made with small amounts of silica particles to enhance its resistance to abrasive wear. Thus, in conventional laminate practice, when it is necessary to produce a glossy surface that also requires an overlay paper, it is normal practice to specify "low ash" or silica-free overlay paper to ensure protection of the expensive highly polished caul plates.

On the other hand, glossy surface laminate has a highly desirable appearance to designers for many applications. However, such glossy surface laminate must be substantially scratch-free, as even only minor abrasion marks, scuffs and faint scratches are very noticeable on gloss surfaces, particularly in dark colors. This intolerance to surface defects makes designers hesitate to use glossy surface laminate for applications exposed to even mild abuse; and in such applications where style dictates glossy surfaces be used, such as retail store display units, end tables and tables in high-end cocktail lounges, the glossy surfaces become dulled and worn looking in a very short time.

The art is therefore faced with two contradictory requirements. First, it is highly desirable to provide abrasion-resistant glossy laminate so that such laminate can be more widely used and will last longer. Second, and on the other hand, the best mechanism for providing an abrasion resistant surface, namely the technology of the above-referenced Scher et al, O'Dell et al and Ungar et al patents, provides a grit surface which damages the costly glossy caul plates and quickly leads to the very problem sought to be avoided. Thus, the idea of making abrasion resistant glossy laminate using the technology disclosed in the aforementioned Scher et al patents, i.e. with the grit concentrated at the surface, seemed impossible to accomplish without rapid destruction of the highly polished caul plates.

SUMMARY OF THE INVENTION

It is, accordingly, an object of the invention to overcome deficiencies in the prior art, such as indicated above.

It is another object of the invention to provide wear resistant-glossy laminates, and especially glossy laminate resistant to sliding can wear.

It is a further object of the present invention to provide improved wear and scuff resistance in glossy laminates without the use of overlay.

It is still another object of the present invention to provide glossy, solid color, high pressure decorative laminates without overlay.

It is still a further object of the present invention to provide printed, glossy, high-pressure decorative laminates of improved wear resistance, having overlay.

It is yet another object of the present invention to provide glossy, printed pattern laminates, without overlay, having improved wear resistance.

These and other objects and the nature and advantages of the instant invention will be more apparent from the following detailed description of certain embodiments of the instant invention as given below. In general, however, the invention constitutes use of the technology of the aforementioned Scher et al, O'Dell et al and/or Ungar et al patents in the manufacture of glossy laminate having a wear resistant surface, and without rapid destruction of the expensive highly polished caul plates, this result being achieved by the use of abrasion-resistant mineral particles or grit having a particle size sufficiently small so that at most only insignificant scratching of the polished caul plate occurs during its pressing operation which does not lead to a rapid destruction of the caul plate polished surface or to an unsatisfactory product having scratch marks.

BRIEF DESCRIPTION OF DRAWING

The sole figure is a comparative graph showing relative wear as measured by the sliding can test applied to conventional laminate and laminate according to the invention.

DETAILED DESCRIPTION OF EMBODIMENTS

As indicated above, the present invention is effected by use of the technology of the aforementioned Scher et al, O'Dell et al and/or Ungar et al patents, the contents of which are hereby incorporated by reference. The major deviation from the Scher et and Ungar et al patents is the utilization of abrasion resistant mineral particles which are much finer than those mentioned in Scher et al and Ungar et al. Thus, according to the Scher et al patents the abrasion-resistant hard mineral particle size preferred is in the range of 20–50 microns, although a broader range is disclosed and permitted. Thus, in the Scher et al U. S. Patent No. Reissue 32,152, in the paragraph spanning cols. 8 and 9, the following is stated:

> An important feature is the size of the alumina or other hard particles. Beneath 20 microns particle size, abrasion resistance becomes poor, and the preferred minimum average particle size is about 25 microns. Maximum average particle size is limited by surface roughness in the article and interference with visual effects. The preferred maximum average size of the abrasive resistant particles is about 50 microns.

Examples 1 and 2 of this patent show runs in which the particle size of the alumina used was as low as 9 microns (run 6 in Example 1 and run 4 in Example 2). The alumina used in these runs is identified by its mean particle size, meaning that there is a particle size distribution in a form of a bell-shaped curve with the peak of the curve being at 9 microns. Thus, for the 9 micron grit used in these examples, there were always particles of size greater than 9 microns.

As can be seen from the results of Tables 1 and 2 in the Scher et al patents, the 9 micron alumina gave some protection, but not excellent protection.

In the face of the above referenced disclosure of the Scher et al patents, the following surprising discoveries have now been made:

(1) The highly polished caul plates used to make glossy laminates are scratched if alumina or silica particles of 9 microns or greater are present on the laminate surface, but are not scratched substantially if the particle size is maintained at less than 9 microns (absolute, not mean) and preferably less than 7 microns (absolute, not mean).

(2) Wear resistance of the glossy laminate as measured by the sliding can test is enhanced to the same degree as occurs by the use of larger size grit, e.g. 30 micron alumina, by the use of fine particled grit of absolute size smaller than 9 microns even though abrasion resistant as measured by the Taber test is as reported in Examples 1 and 2 of said Scher et al patents including U.S. Pat. No. Re 32,152. It is thus surprising that while abrasion resistance as measured by the Taber test is reduced as the particle size of the grit becomes smaller, on the other hand sliding can performance does not markedly deteriorate as the particle size is reduced. Thus, excellent glossy laminate is produced according to the techniques of said Scher et al, O'Dell et al and/or Ungar et al patents using abrasive particles ranging in size from 0.5 microns up to but no greater than 9 microns absolute, without destruction of the glossy plates.

Unless otherwise specifically designated, "wear resistance" as used herein is the resistance of a glossy laminate to loss of gloss when the surface of laminate is exposed to the abrasive effects of sliding objects. For example, if a display counter in a store with a glossy laminate surface is exposed for a period of time to sliding cartons or merchandise, the gloss will gradually be reduced causing the laminate to look dull and worn. The resistance to this dulling action is defined herein as "wear resistance". Such wear resistance is not to be confused with abrasion resistance as measured by NEMA LD 3.01-1985. The "sliding can test" referred to herein and described in the Scher et al U.S. Pat. No. 4,255,480 and U.S. Pat. No. Reissue 32,152 is an accelerated laboratory test which predicts the ability of the laminate to resist wear as described above, and is therefore a laboratory test for determining "wear resistance".

Another deviation from the preferred procedures of the aforementioned patents is the use of a somewhat greater quantity of grit. The range given in the aforementioned Scher et al patents is relatively broad, although in practice the grit has been coated at a rate of about 2 pounds per ream (a "ream" in the present field is 3,000 sq. ft.) for solid colors laminate (see the Ungar et al and Scher et al patents). According to the present invention somewhat higher weights are preferred in the range of from about 4 pounds to about 10 pounds of grit per ream even for solid color laminate.

The abrasion resistant mineral is preferably alumina, although it will be understood that any abrasion resisting mineral particles having a hardness of from 7-10 on the Moh scale can be used, such as those indicated in the aforementioned Scher et al patents, so long as the particle size is sufficiently small that substantial scratching of the glossy pressing plates is avoided, the maximum particle size for alumina and silica and mixtures thereof being 9 microns and preferably no greater than 7 microns. Alumina is the preferred abrasion resistant mineral, and it is sold in sizes of 0.7 microns, 2.6 microns, 5 microns, 7 microns and 9 microns mean particle size. The 2.6 micron size is preferred, as its distribution curve is such that there are substantially no particles larger 9 microns. If larger sizes of alumina are used, they must be filtered to ensure that substantially no particles of greater than 9 microns (preferably no greater than 7 microns) remain in the mixture; as such a filtering step adds another operation, and as the filters have a tendency to become rapidly clogged especially when using the 7 or 9 micron alumina, again the 2.6 micron alumina is preferred.

The binder material for the grit is preferably microcrystalline cellulose as disclosed in the aforementioned Scher et al and Ungar et al patents. On the other hand, a wide variety of other binder materials can be used, even though not preferred, including those mentioned in the aforementioned Scher et al patents, Kelgin, silica aerogel, fumed silica and a wide variety resin binders including melamine resin.

Other materials can also be included in the coating composition including surfactant, anti-foaming agent, wax as taught in the aforementioned O'Dell et al patents and/or silane as mentioned in the aforementioned Scher et al patents.

Glossy laminate according to present invention can be made either with or without overlay. If made with overlay, the ultra-thin coating of grit and binder material is applied to the overlay; if made without overlay, then the ultra-thin coating of grit and binder material is applied directly to the facing surface of the decor sheet. Because the ultra-thin coating does not provide sufficient abrasion resistance (as measured by the NEMA LD3-1985 test) by itself, glossy laminate made according to the present invention using a printed design on the upper surface of the decor sheet and no overlay will not meet NEMA abrasion standards. Even so, because of the highly surprising sliding can wear resistance, such glossy laminate is suitable and indeed superior to conventional glossy laminate having overlay for most commercial purposes. Solid colored glossy laminate made according to the invention does meet NEMA abrasion standards, as does printed pattern glossy laminate having overlay.

The following specific examples are offered illustratively:

Examples 1–16

Examples 1–16 were carried out according to the process of Unger et al U.S. Pat. No. 4,713,138 with the coating being applied to solid colored decor paper. The coating/impregnating compositions contain the ingredient as set forth in Table 1 below, all figures being given in parts per weight. No overlay was used in the manufacture of glossy solid colored laminate.

TABLE 1

| | Example No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Melamine Resin-62% Solids | 479 | 479 | 479 | 479 | 479 | 479 | 479 | 479 | 479 | 479 | 479 | 479 | 479 | 479 | 479 | 479 |
| Water | 195 | 195 | 195 | 195 | 195 | 195 | 195 | 195 | 195 | 195 | 195 | 195 | 195 | 195 | 195 | 195 |
| 0.7 Micron Alumina | | | | | | | | | | | | | | | 50 | 30 |
| 2.6 Micron Alumina | 10.21 | | | 10.21 | 30 | 50 | 30 | 30 | 30 | 30 | 30 | 30 | | | | |
| 5 Micron Al$_2$O$_3$ | | 10.21 | | | | | | | | | | | | | | |
| 9 Micron Al$_2$O$_3$ | | | 10.21 | | | | | | | | | | | | | |
| 25 Micron Al$_2$O$_3$ | | | | | | | | | | | | | 10.21 | — | | |
| 30 Micron Al$_2$O$_3$ | | | | | | | | | | | | 10.21 | | 10.21 | | |
| 15 Micron Silica | | | | | | | | | | | | 13 | | | | |
| CF21 Surfactant | 0.14 | 0.14 | 0.14 | 0.14 | 0.14 | 0.14 | 0.14 | 0.14 | 0.14 | 0.14 | 0.14 | 0.14 | 0.14 | 0.14 | 0.14 | 0.14 |
| 2652 Emcrest Antifoam | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| PE394 Wax-Shamrock | 1.1 | 1.1 | 1.1 | — | — | | | | | | | | | | | |
| X-5175 Wax Shamrock | | | | | | | | 1.0 | | | | | | | | 1.0 |
| Kelgin | | | | | | | | 5.95 | | | | | | | | |
| Cabo Sil. (Fumed Sil.) | | | | | | | | | | 13 | | | | | | |
| Silica aerogel | | | | | | | | | | | 13 | | | | | |
| Avicel (microcrystalline cellulose) | 5.95 | 5.95 | 5.95 | 5.95 | 5.95 | 5.95 | 5.95 | — | | | | 5.95 | 5.95 | 5.95 | 5.95 | 5.95 |

In Table 1 above, a quantity of 10.21 parts of grit corresponds to an application rate of 2.0 pounds per ream; a quantity of 30 parts of grit corresponds to an application rate of 6 pounds per ream; and a quantity of 50 parts of grit corresponds to an application rate of 10 pounds per ream. Kelgin is sodium alginate. Cabo Sil is fumed silica of millimicron size. Silica aerogel is of submicron size.

After each example, the glossy press plates were inspected for scratches and the resultant laminates were tested according to the sliding can test (2000 cycles) for wear resistance. The results were as set forth in Table 2 below:

TABLE 2

| | Laminate | Glossy Caul Plate |
|---|---|---|
| Example 1 | Good wear resistance; poor sand paper resistance | No scratches |
| Example 2 | Good wear resistance | Slight plate damage |
| Example 3 | Good wear resistance | Plate damage |
| Example 4 | Slight gloss damage | No plate damage |
| Example 5 | Good scuff and wear resistance and good fine sand sand paper resistance | No plate damage |
| Example 6 | Clarity impaired | No plate damage |
| Example 7 | Same as Example 5 plus very good scuff resistance | No plate damage |
| Example 8 | Same as Example 5 | No plate damage |
| Example 9 | Same as Example 5 | No plate damage |
| Example 10 | Same as Example 5 | No plate damage |
| Example 11 | Good wear resistant | Scratched plate |
| Example 12 | Good wear resistant | Scratched plate |
| Example 13 | Good wear resistant | Scratched plate |

TABLE 2-continued

| | Laminate | Glossy Caul Plate |
|---|---|---|
| Example 14 | Good wear resistant | Scratched plate |
| Example 15 | Good wear resistant | No plate damage |
| Example 16 | Good wear resistant | No plate damage |

Examples 17-20

These examples were carried out using the process of Scher et al U.S. Pat. No. 4,255,480. Solid color laminate was made without overlay. The ultra-thin coating was applied from the composition set forth below in Table 3:

TABLE 3

| | Example No. | | | |
|---|---|---|---|---|
| | 17 | 18 | 19 | 20 |
| Water | 834 | 834 | 834 | 834 |
| 2.6 Micron Alumina | 100 | 100 | 100 | 100 |
| Kelgin | | | 15 | |
| Avicel | 14.4 | 10 | — | 14.4 |
| CMC 7 M | 5 | 5 | 5 | 3 |
| Acetic Acid | 0.19 | 0.19 | 0.19 | 0.19 |

The quantities in Table 3 above are given in parts by weight. With regard to the 2.6 micron alumina at 100 parts by weight, this corresponded to an application rate of 6 pounds per ream. Avicel is microcrystalline cellulose; CMC 7 M is carboxy methylcellulose and Kelgin is sodium alginate.

The results of examples 17-20 were excellent. The resultant glossy laminates had good sliding can wear resistance and the glossy pressing plates were not damaged during the lamination procedures.

Example 21

A control example is carried out similar to Example 17 above except that no alumina is used. The resultant laminate, subjected to the sliding can test at 2000 cycles, shows extreme dulling of the originally glossy surface.

Example 22

The sole figure graphically shows the comparison in sliding can wear resistance between a conventional or standard high gloss laminate and a laminate according to the present invention made according to Example 17. The standard glossy laminate was solid colored and had no overlay. Both laminates had the same decor sheet. As can be seen, the standard high gloss laminate had an initial gloss value of 105, while that of the invention had an initial gloss value of 101. After about forty double strokes according to the sliding can test, the gloss values were equal with the gloss values of the standard high gloss laminate falling rapidly. After only one hundred double strokes, the gloss value of the standard laminate had fallen to about ninety-six while the gloss value of the laminate according to the invention had improved slightly. After only three hundred double strokes, the gloss value of the standard high gloss laminate had fallen to only about eighty-three, and such laminate had a decidedly dull and worn appearance. After about seven hundred double strokes the standard laminate had a gloss value of only about seventy-seven, while the gloss value of the laminate according to the invention remained very high (almost 105).

Example 23

A printed pattern laminate is made according to the process of Example 5 above, the ultra-thin coating being applied directly on top of the printed surface. The results are the same as in Example 5, except that the laminate does not meet NEMA abrasion standards and therefore cannot be titled "high pressure decorative laminate". Nevertheless, the glossy surface is wear resistant according to the sliding can test and is commercially acceptable.

Example 24

Overlay paper is coated with the formulation of Example 5 according to the aforementioned Ungar et al U.S. Pat. No. 4,713,138, and such overlay paper is used in the manufacture of laminate over a decor sheet having a printed design on its surface. The resultant glossy laminate fully meets NEMA standards and also has excellent wear according to the sliding can test. The glossy printing plates are undamaged.

The foregoing description of the specific embodiments will so fully reveal the general nature of the invention that others can, by applying current knowledge, readily modify and/or adapt for various applications such specifice embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A wear-resistant glossy laminate comprising a backing and a thermoset resin impregnating facing sheet laminated thereto, said facing sheet having an upper facing surface having an ultra-thin wear resistant layer thereon which protects the glossy nature of said surface when exposed to the abrasive effects of sliding objects, said ultra-thin wear resistant layer comprising means for resisting surface dulling consisting of abrasion resistant particles having a hardness of 7-10 on the Moh scale and a maximum particle size up to 7 micrometers and in the substantial absence of abrasion resistant particles of 7 micrometers and a greater size, said particles being held in place on said upper facing surface by a small amount of binder material sufficient to hold said particles on the upper facing surface of said facing sheet.

2. A wear-resistant glossy laminate according to claim 1, wherein said facing sheet is a decor sheet.

3. A wear-resistant glossy laminate according to claim 1, wherein said facing sheet is an overlay, and wherein a printed decor sheet is provided between said overlay and said backing.

4. A wear-resistant glossy laminate according to claim 2, wherein said decor sheet is solid colored.

5. A wear-resistant glossy laminate according to claim 2, wherein said decor sheet is printed.

6. A wear-resistant glossy laminate according to claim 1, wherein said abrasion resistant particles comprise alumina.

7. A wear-resistant glossy laminate according to claim 1, wherein said binder material comprises microcrystalline cellulose.

8. A wear-resistant glossy laminate according to claim 1, wherein said abrasion resistant particles are present in said ultra-thin layer in a quantity in the range of from about 4 pounds to about 10 pounds per ream.

9. A wear-resistant glossy laminate according to claim 1, wherein said ultra-thin wear-resistant layer further comprises a small quantity of wax.

10. A wear-resistant glossy laminate according to claim 1, wherein said ultra-thin wear-resistant layer further comprises a small quantity of silane.

11. A wear-resistant glossy laminate according to claim 1, wherein said ultra-thin layer protects the glossy nature of said surface when subjected to 200–300 cyles of the sliding can test.

12. A wear-resistant glossy laminate according to claim 1, wherein said ultra-thin wear-resistant layer protects the glossy nature of said surface when subjected to 2,000 cycles of the sliding can test.

13. A facing sheet for use in the manufacture of a wear-resistant glossy laminate, said facing sheet having an ultra-thin wear-resistant layer on an upper facing surface thereof which layer will protect against sliding can wear of the glossy nature of said surface after formation of a wear-resistant glossy laminate using said facing sheet, said ultra-thin wear-resistant layer comprising abrasion resistant particles having a hardness of 7–10 on the Moh scale and a maximum particle size up to 7 micrometers as the only abrasion resistant particles, held in place on said upper facing sheet by a small amount of binder material sufficient to hold said particles on the upper facing surface of said facing sheet.

14. A facing sheet according to claim 13, impregnated with a thermosetting resin.

15. A facing sheet according to claim 13, wherein said abrasion resistant particles are present in said ultra-thin layer in a quantity in the range of from about 4 pounds to about 10 pounds per ream.

16. A facing sheet according to claim 13, wherein said ultra-thin wear-resistant layer further comprises a small quantity of wax.

17. A facing sheet according to claim 13, wherein said ultra-thin wear-resistant layer further comprises a small quantity of silane.

* * * * *